(12) United States Patent
Stewart

(10) Patent No.: US 11,007,571 B2
(45) Date of Patent: May 18, 2021

(54) METHOD OF MANUFACTURING AN AUSTENITIC IRON ALLOY

(71) Applicant: ROLLS-ROYCE plc, London (GB)

(72) Inventor: David A. Stewart, Derby (GB)

(73) Assignee: ROLLS-ROYCE PLC, London (GB)

( * ) Notice: Subject to any disclaimer, the term of this patent is extended or adjusted under 35 U.S.C. 154(b) by 190 days.

(21) Appl. No.: 16/271,039

(22) Filed: Feb. 8, 2019

(65) Prior Publication Data
US 2019/0264303 A1 Aug. 29, 2019

(30) Foreign Application Priority Data

Feb. 27, 2018 (GB) .................................... 1803142

(51) Int. Cl.
| | | |
|---|---|---|
| B22F 3/15 | (2006.01) |
| C22C 38/00 | (2006.01) |
| C22C 1/04 | (2006.01) |
| C22C 33/02 | (2006.01) |
| C22C 38/34 | (2006.01) |
| C22C 38/58 | (2006.01) |
| C22C 38/40 | (2006.01) |
| C22C 38/56 | (2006.01) |
| C22C 38/02 | (2006.01) |

(52) U.S. Cl.
CPC ................. *B22F 3/15* (2013.01); *C22C 1/04* (2013.01); *C22C 33/0285* (2013.01); *C22C 38/001* (2013.01); *C22C 38/02* (2013.01); *C22C 38/34* (2013.01); *C22C 38/58* (2013.01); B22F 2201/02 (2013.01); B22F 2999/00 (2013.01); C21D 2211/001 (2013.01); C21D 2241/02 (2013.01); C22C 33/0207 (2013.01); C22C 38/40 (2013.01); C22C 38/56 (2013.01)

(58) Field of Classification Search
CPC ....... C22C 38/001; C22C 38/02; C22C 38/04; C22C 38/08; C22C 38/18; C22C 38/34; C22C 38/36; C22C 38/38; C22C 38/40; C22C 38/56; C22C 38/58; C22C 33/0285; C22C 33/0207; C22C 1/04; B22F 3/15; B22F 2201/02; B22F 2999/00; C21D 2211/001; C21D 2241/02
See application file for complete search history.

(56) References Cited

U.S. PATENT DOCUMENTS

| | | | |
|---|---|---|---|
| 3,912,503 A | | 10/1975 | Schumacher et al. |
| 4,581,202 A | * | 4/1986 | Kudo ................... C22C 33/0207 419/42 |
| 4,803,045 A | * | 2/1989 | Ohriner .............. B23K 35/3086 148/327 |
| 2004/0141870 A1 | | 7/2004 | Michaluk et al. |
| 2007/0023107 A1 | | 2/2007 | Westin |
| 2012/0082586 A1 | | 4/2012 | Moyer |
| 2016/0184895 A1 | | 6/2016 | Raisson et al. |
| 2019/0055633 A1 | * | 2/2019 | Chinella ................. C22C 38/44 |

FOREIGN PATENT DOCUMENTS

| | | |
|---|---|---|
| JP | S61201706 A | 9/1986 |
| JP | 61227153 A * | 10/1986 |
| JP | S61227153 A | 10/1986 |
| SE | 462837 B | 9/1990 |
| WO | 2017/068153 A1 | 4/2017 |

OTHER PUBLICATIONS

Ohriner, et al., "The Chemistry and Structure of Wear-Resistant, Iron-Base Hardfacing Alloys," May 1991, Metallurgical Transactions, vol. 22A, pp. 983-991 (Year: 1991).*
Simmons, et al. "Microstructural Characterization of as-cast High-Nitrogen Fe—15Cr—15Ni Alloys," 1992, Journal of Materials Science, vol. 27, pp. 6105-6115 (Year: 1992).*
May 22, 2019 European Search Report issued in European Patent Application No. 19156181.0.
Simmons et al., Microstructural Characterization of as-cast High-Nitrogen Fe—15Cr—15Ni Alloys, Jounral of Materials Science, vol. 27, pp. 6105-6115, 1992.
Aug. 20, 2018 British Search Report issued in British Patent Application No. 1803142.7.

* cited by examiner

*Primary Examiner* — Anthony J Zimmer
*Assistant Examiner* — Dean Mazzola
(74) *Attorney, Agent, or Firm* — Oliff PLC

(57) ABSTRACT

A method of manufacturing an austenitic iron alloy comprising placing austenitic iron alloy powder in a can, evacuating air and other gases from the can, supplying nitrogen gas into the can, sealing the can and then hot isostatically pressing the austenitic iron alloy powder in the can to diffuse the nitrogen into the austenitic iron alloy powder and to produce a nitrogen enriched austenitic iron alloy bar and removing the can from the nitrogen enriched austenitic iron alloy bar.

18 Claims, 2 Drawing Sheets

METHOD OF MANUFACTURING AN AUSTENITIC IRON ALLOY

The present disclosure relates to method of manufacturing austenitic iron alloy or austenitic steel.

Nitrogen is commonly added to an austenitic iron alloy, an austenitic steel, to improve the strength and/or increase the corrosion resistance and/or provide austenite phase stabilisation of the austenitic iron alloy or austenitic steel. Nitrogen is commonly added to the austenitic iron alloy during the production of the raw materials for the austenitic iron alloy, e.g. during a casting process for example by using a master alloy with a relatively high nitrogen content. Nitrogen may be added to the austenitic iron alloy during manufacture of a component, e.g. by nitriding the austenitic iron alloy component. The nitriding of the austenitic iron alloy is performed at a relatively high temperature which may affect the mechanical properties of the austenitic iron alloy component. Furthermore, areas of the austenitic iron alloy component which do not require nitriding must be masked off to prevent them being nitrided, which adds time and cost to the nitriding process.

Austenitic iron alloy components may be manufactured by casting the alloy into moulds. Austenitic iron alloy components may be also manufactured by powder metallurgy. This involves placing austenitic iron alloy powder in a can, evacuating air and other gases from the can, sealing the can and then hot isostatically pressing the can to produce an austenitic iron alloy bar. The can is then removed from the austenitic iron alloy bar and the austenitic iron alloy bar is then used to make components.

According to a first aspect there is provided a method of manufacturing an austenitic iron alloy comprising placing austenitic iron alloy powder in a can, evacuating air and other gases from the can, supplying nitrogen gas into the can, sealing the can and then hot isostatically pressing the austenitic iron alloy powder in the can to diffuse the nitrogen into the austenitic iron alloy powder and to produce a nitrogen enriched austenitic iron alloy bar and removing the can from the nitrogen enriched austenitic iron alloy bar, the nitrogen enriched austenitic iron alloy consists of 12 to 41 wt % chromium, 7 to 9 wt % manganese, 4 to 5 wt % silicon, 4 to 6 wt % nickel, up to 2.5 wt % carbon, less than 0.2 wt % nitrogen and the balance iron plus incidental impurities.

The austenitic iron alloy powder may comprise austenitic iron alloy powder or a mixture of austenitic iron alloy powder and one or more other phases of iron alloy powder.

The mixture of austenitic iron alloy powder and one or more other phases of iron alloy powder may comprise a mixture of austenitic iron alloy powder and ferritic iron alloy powder.

Nitrogen reduces stacking fault energy throughout the entire austenitic matrix of the austenitic iron alloy.

The austenitic iron alloy powder may comprise powder particles with a size of no more than 150 micrometres.

The austenitic iron alloy powder may comprise powder particles with a size no less than 50 micrometres.

The can may comprise a mild steel can.

The method may comprise hot isostatically pressing the austenitic iron alloy powder in the can at temperature of 1000° C. to 1200° C. The method may comprise hot isostatically pressing the austenitic iron alloy powder in the can at temperature of 1110° C. to 1130° C. The method may comprise hot isostatically pressing the austenitic iron alloy powder in the can at temperature of 1120° C.

The method may comprise hot isostatically pressing the austenitic iron alloy powder in the can at a pressure of 80 MPa to 140 MPa. The method may comprise hot isostatically pressing the austenitic iron alloy powder in the can at a pressure of 90 MPa to 110 MPa. The method may comprise hot isostatically pressing the austenitic iron alloy powder in the can at a pressure of 100 MPa.

The nitrogen enriched austenitic iron alloy may consist of 28 wt % chromium, 9 wt % manganese, 5 wt % silicon, 6 wt % nickel, up to 2.5 wt % carbon, less than 0.2 wt % nitrogen and the balance iron plus incidental impurities.

The nitrogen enriched austenitic iron alloy may consist of 0.8 to 1.2 wt % carbon. The nitrogen enriched austenitic iron alloy may consist of 1.7 to 2.0 wt % carbon. The nitrogen enriched austenitic iron alloy may consist of 2.2 to 2.5 wt % carbon.

The nitrogen enriched austenitic iron alloy may consist of 0.08 to 0.2 wt % nitrogen.

The nitrogen enriched austenitic iron alloy does not contain cobalt.

The nitrogen enriched austenitic iron alloy may be used to manufacture a component or to provide a coating on a component.

The component may be a component part of a nuclear reactor. More generally the nitrogen enriched austenitic alloy may constitute an article or constitute a coating of an article, e.g. a hard facing.

The austenitic iron alloy may be austenitic steel.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
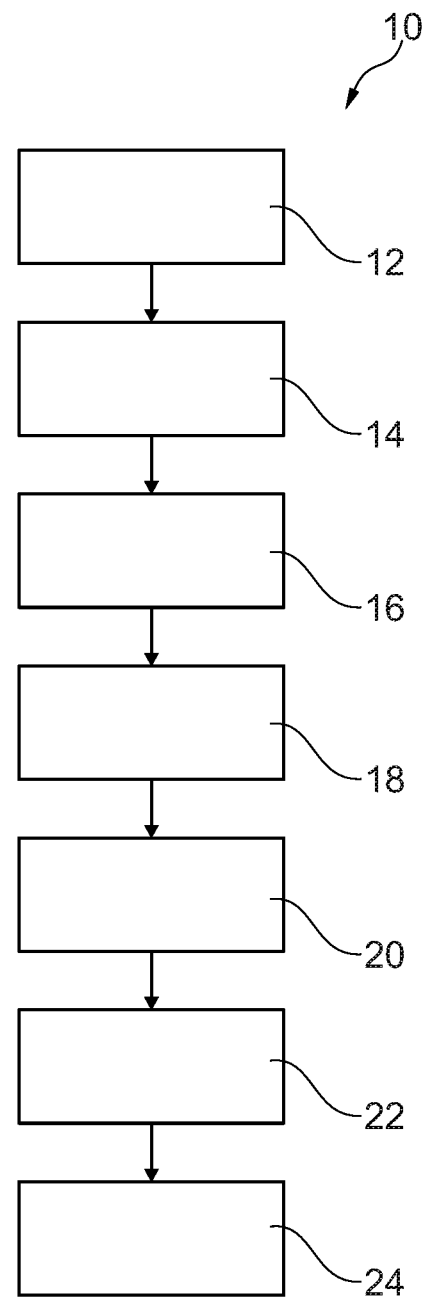
FIG. 1 is a flow chart illustrating a method of manufacturing an austenitic iron alloy.

A method of manufacturing an austenitic iron alloy, as shown in FIG. 1, comprises placing an austenitic iron alloy powder in a can 12, evacuating air and other gases from the can 14, supplying nitrogen gas into the can 16, sealing the can 18 and then hot isostatically pressing the austenitic iron alloy powder in the can to diffuse the nitrogen into the austenitic iron alloy powder and to produce a nitrogen enriched austenitic iron alloy bar 20 and removing the can from the nitrogen enriched austenitic iron alloy bar 22. The hot isostatic pressing consolidates, e.g. compresses and diffusion bonds, the austenitic iron alloy powder particles 34 into an austenitic iron alloy bar 20. The austenitic iron alloy powder is initially produced by gas atomisation comprising melting the iron alloy to produce liquid iron alloy and then gas atomising the liquid iron alloy to rapidly produce solid powder iron alloy. The austenitic iron alloy powder may comprise austenitic iron alloy powder or a mixture of austenitic iron alloy powder and one or more other phases of iron alloy powder, e.g. a mixture of austenitic iron alloy powder and ferritic iron alloy powder, due to the rapid solidification of the liquid iron alloy during the gas atomisation of the liquid iron alloy. The combination of the composition of the iron alloy powder and the thermal processing of the iron alloy powder during the hot isostatic pressing produces the austenite phase in the consolidated austenitic iron alloy bar.

Figure 2:
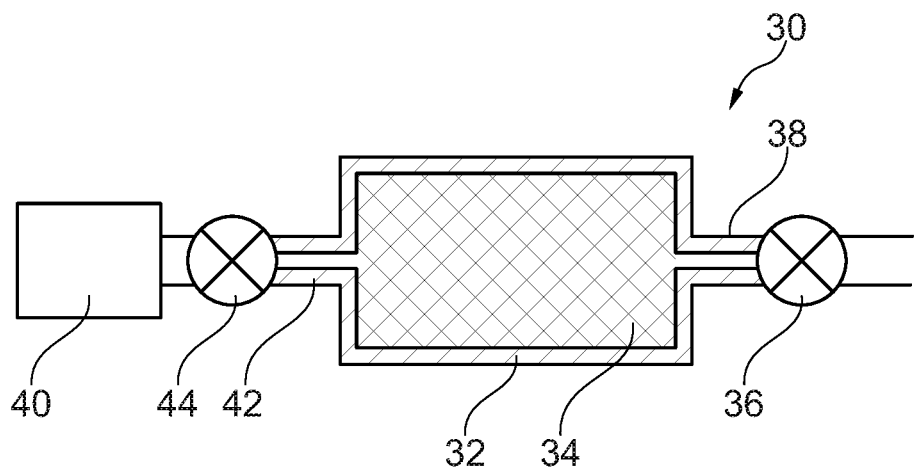
FIG. 2 is a schematic diagram showing an apparatus used to evacuate and to supply nitrogen to a can used in a method of manufacturing an austenitic iron alloy.

FIG. 2 illustrates an apparatus 30 used to evacuate air and other gases from the can and to supply nitrogen to the can. FIG. 2 shows a can 32 containing an austenitic iron alloy powder 34. The austenitic iron alloy may be austenitic steel. The can 32 may comprise a mild steel can. The austenitic iron alloy powder 34 placed into the can 32 comprises powder particles with a size of no more than 150 micrometres. The austenitic iron alloy powder 34 placed into the canister 32 comprises powder particles with a size no less than 50 micrometres.

A pump 36 is arranged to evacuate air and other gases from the interior of the can 32 via pipe 38 and a source of nitrogen gas 40 is arranged to supply nitrogen to the interior of the can via a pipe 42 and a valve 44. The pump 36 is arranged to evacuate the gases from the interior of the can 32 through the pipe 38 and then the pipe 38 is sealed by any suitable technique, e.g. welding or crimping and welding. Once the pipe 38 has been sealed the valve 44 is opened to supply nitrogen through the pipe 42 into the interior of the can 32. When a sufficient amount of nitrogen is supplied into the can 32, the pipe 42 is sealed by any suitable technique, e.g. welding or crimping and welding, to form a fully sealed can 32. The sealed can 32 is then removed from the nitrogen supply 40, valve 44 and pump 36 and is ready for hot isostatic pressing.

Figure 3:
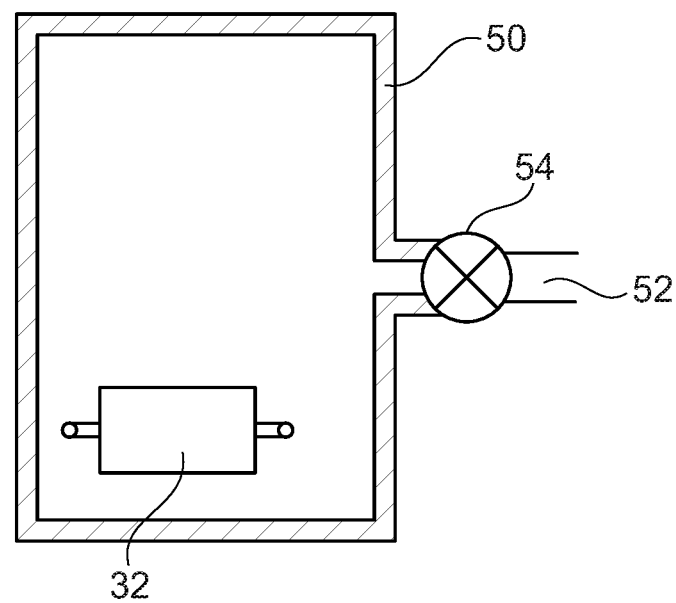
FIG. 3 is a schematic diagram showing a hot isostatic pressing furnace for use in a method of manufacturing an austenitic iron alloy.

FIG. 3 shows the sealed can 32 containing the austenitic iron alloy powder in a hot isostatic pressing (HIP) vessel 50. The HIP vessel 50 has heaters and a pipe 52 and a valve 54 to supply inert gas into the HIP vessel 50. The HIP vessel 50 is supplied with inert gas and the temperature and the pressure within the HIP vessel 50 is increased to hot isostatically press the austenitic iron alloy powder 34 in the can 32 to diffuse the nitrogen into the austenitic iron alloy powder 34 and to produce a nitrogen enriched austenitic iron alloy bar.

The method comprises hot isostatically pressing the austenitic iron alloy powder 34 in the can 32 at temperature of 1000° C. to 1200° C. The method comprises hot isostatically pressing the austenitic iron alloy powder 34 in the can 32 at temperature of 1110° C. to 1130° C. and for example the comprises hot isostatically pressing the austenitic iron alloy powder 34 in the can 32 at temperature of 1120° C. The method comprises hot isostatically pressing the austenitic iron alloy powder 34 in the can 32 at a pressure of 80 MPa to 140 MPa. The method comprises hot isostatically pressing the austenitic iron alloy powder 34 in the can 32 at a pressure of 90 MPa to 110 MPa and for example the method comprises hot isostatically pressing the austenitic iron alloy powder 34 in the can 32 at a pressure of 100 MPa. The hot isostatic pressing comprises maintaining the temperature and pressure constant for several hours. In one example the method comprises hot isostatically pressing the austenitic iron alloy powder 34 in the can 32 at a temperature of 1120° C. and at a pressure of 100 MPa for 4 hours.

If temperatures lower than 1120° C. are used, the pressure and time for hot isostatically pressing the austenitic iron alloy powder are increased appropriately. If temperatures greater than 1120° C. are used, the pressure and time for hot isostatically pressing the austenitic iron alloy powder are decreased appropriately. The heating rate may be 10° C. per minute and the cooling rate may be 10° C. per minute.

The resulting nitrogen enriched austenitic iron alloy bar consists of no more than 0.2 wt % nitrogen. The resulting nitrogen enriched austenitic iron alloy may consist of up to 2.5 wt % carbon, the addition of carbon results in austenitic steel alloy. The nitrogen enriched austenitic iron alloy consists of 12 to 41 wt % chromium, 7 to 9 wt % manganese, 4 to 5 wt % silicon, 4 to 6 wt % nickel, less than 0.2 wt % nitrogen and the balance iron plus incidental impurities. For example the nitrogen enriched austenitic iron alloy consists of 28 wt % chromium, 9 wt % manganese, 5 wt % silicon, 6 wt % nickel, less than 0.2 wt % nitrogen and the balance iron plus incidental impurities. The nitrogen enriched austenitic iron alloy may consist of 0.08 to 0.2 wt % nitrogen. It is to be noted that the austenitic iron alloy does not contain cobalt.

In one embodiment, the austenitic iron alloy has, by weight, 0.8 to 1.2 wt % carbon. This produces an alloy which has comparable carbide content to Stellite 6. In another embodiment, the austenitic iron alloy has, by weight, 1.7 to 2.0 wt % carbon. This produces an alloy which has comparable carbide content to Stellite 12. In another embodiment, the austenitic alloy has, by weight, 2.2 to 2.5 wt % carbon. This produces an alloy which has comparable carbide content to Stellite 3. Stellite is a registered trade mark.

Referring back to FIG. 1, the resulting nitrogen enriched austenitic iron alloy bar may be used to manufacture a component or to provide a coating on a component 24. The resulting nitrogen enriched austenitic iron alloy bar may be machined into pieces which are subsequently machined, shaped or formed into articles or the resulting nitrogen enriched austenitic iron alloy bar may be processed into powder form to be used to provide a coating on an article or the resulting nitrogen enriched austenitic iron alloy bar may be machined into pieces which are subsequently machined, shaped or formed into shaped coatings or shaped linings for an article. The article may be a component part of a nuclear reactor. More generally the nitrogen enriched austenitic alloy may constitute an article or constitute a coating of an article, e.g. a hard facing.

The advantage of the present disclosure is that because the nitrogen is added to the austenitic iron alloy in a powder metallurgy processing, while the austenitic iron alloy is in the can and before the can is sealed and hot isostatically pressed, the uptake of the nitrogen into the austenitic iron alloy is more effective due to the large surface area to volume ratio associated with austenitic iron alloy powder rather than bulk (liquid or solid) austenitic iron alloy. The hot isostatic pressing (HIP) process is utilised to cause the nitrogen to diffuse into the austenitic iron alloy and to consolidate the austenitic iron alloy powder into an austenitic iron alloy bar. Thus, the hot isostatic pressing (HIP) process performs two distinct, but parallel, activities at the same time. The large surface area to volume ratio of the austenitic iron alloy powder ensures that the nitrogen is introduced into the austenitic iron alloy such that it produces a more uniform distribution of the nitrogen within the austenitic iron alloy and the time, pressure and temperature profile of the hot isostatic pressing (HIP) process enables this to be achieved. Nitrogen reduces stacking fault energy throughout the entire austenitic matrix of the austenitic iron alloy or austenitic steel. Additions of nitrogen above 0.2 wt % may result in some of the nitrogen reacting with chromium to form a chromium nitride $Cr_2N$ phase which increases the hardness, decreases the ductility and reduces the corrosion resistance of the austenitic iron alloy by reducing the amount of free chromium.

Hard facing austenitic iron alloys require low stacking fault energy because low stacking fault energy makes it easier to put internal defects in to the crystal structure of the austenitic iron alloy. Internal defects in the crystal structure of the austenitic iron alloy make the matrix stronger and so harder to deform which results in higher galling resistance as galling produces permanent plastic deformation at the contacting surfaces of hard facing austenitic alloys. Hence lower stacking fault energy means more internal defects means higher deformation stresses are required hence greater galling resistance.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed:

1. A method of manufacturing an austenitic iron alloy comprising placing austenitic iron alloy powder and optionally, one or more other phases of iron alloy powder, thereby forming a powder mixture thereof with the austenitic iron alloy powder, in a can, evacuating air and other gases from the can, supplying nitrogen gas into the can, sealing the can and then hot isostatically pressing the austenitic iron alloy powder or powder mixture in the can to diffuse the nitrogen into the austenitic iron alloy powder or powder mixture and to produce a nitrogen enriched austenitic iron alloy bar and removing the can from the nitrogen enriched austenitic iron alloy bar, wherein the nitrogen enriched austenitic iron alloy consists of 12 to 41 wt % chromium, 7 to 9 wt % manganese, 4 to 5 wt % silicon, 4 to 6 wt % nickel, more than 0% and up to 2.5 wt % carbon, more than 0% but no more than 0.2 wt % nitrogen and the balance iron plus incidental impurities, wherein the austenitic iron alloy powder and optionally, the one or more other phases of iron alloy powder are the only powder components in the can prior to sealing the can.

2. A method as claimed in claim 1 wherein the austenitic iron alloy powder comprises powder particles with a size of no more than 150 micrometres.

3. A method as claimed in claim 1 wherein the austenitic iron alloy powder comprises powder particles with a size no less than 50 micrometres.

4. A method as claimed in claim 1 wherein the can comprises a mild steel can.

5. A method as claimed in claim 1 comprising hot isostatically pressing the austenitic iron alloy powder in the can at temperature of 1000° C. to 1200° C.

6. A method as claimed in claim 1 comprising hot isostatically pressing the austenitic iron alloy powder in the can at temperature of 1110° C. to 1130° C.

7. A method as claimed in claim 6 comprising hot isostatically pressing the austenitic iron alloy powder in the can at temperature of 1120° C.

8. A method as claimed in claim 1 comprising hot isostatically pressing the austenitic iron alloy powder in the can at a pressure of 80 MPa to 140 MPa.

9. A method as claimed in claim 1 comprising hot isostatically pressing the austenitic iron alloy powder in the can at a pressure of 90 MPa to 110 MPa.

10. A method as claimed in claim 9 comprising hot isostatically pressing the austenitic iron alloy powder in the can at a pressure of 100 MPa.

11. A method as claimed in claim 1 wherein the nitrogen enriched austenitic iron alloy consists of 28 wt % chromium, 9 wt % manganese, 5 wt % silicon, 6 wt % nickel, more than 0% and up to 2.5 wt % carbon, more than 0% but no more than 0.2 wt % nitrogen and the balance iron plus incidental impurities.

12. A method as claimed in claim 1 wherein the nitrogen enriched austenitic iron alloy contains carbon in an amount of 0.8 to 1.2 wt %.

13. A method as claimed in claim 1 wherein the nitrogen enriched austenitic iron alloy contains carbon in an amount of 1.7 to 2.0 wt %.

14. A method as claimed in claim 1 wherein the nitrogen enriched austenitic iron alloy contains carbon in an amount of 2.2 to 2.5 wt %.

15. A method as claimed in claim 1 wherein the nitrogen enriched austenitic iron alloy contains nitrogen in an amount of 0.08 to 0.2 wt %.

16. A method of manufacturing an austenitic iron alloy comprising placing austenitic iron alloy powder and optionally, one or more other phases of iron alloy powder, thereby forming a powder mixture thereof with the austenitic iron alloy powder, in a can, evacuating air and other gases from the can, supplying nitrogen gas into the can, sealing the can and then hot isostatically pressing the austenitic iron alloy powder or powder mixture in the can to diffuse the nitrogen into the austenitic iron alloy powder or powder mixture and to produce a nitrogen enriched austenitic iron alloy bar and removing the can from the nitrogen enriched austenitic iron alloy bar, wherein the nitrogen enriched austenitic iron alloy bar contains more than 0% but no more than 0.2 wt % nitrogen, and wherein the austenitic iron alloy powder and optionally, the one or more other phases of iron alloy powder are the only powder components in the can prior to sealing the can.

17. A method as claimed in claim 16 wherein the nitrogen enriched austenitic iron alloy contains nitrogen in an amount of 0.08 to 0.2 wt %.

18. A method as claimed in claim 16 wherein the nitrogen enriched austenitic iron alloy contains carbon in an amount of more than 0% and up to 2.5 wt %.

* * * * *